United States Patent
Jons

(10) Patent No.: US 8,571,296 B2
(45) Date of Patent: Oct. 29, 2013

(54) METHOD OF TESTING THE INTEGRITY OF SPIRAL WOUND MODULES

(75) Inventor: Steven D. Jons, Eden Prairie, MN (US)

(73) Assignee: Dow Global Technologies LLC, Midland, MI (US)

( * ) Notice: Subject to any disclaimer, the term of this patent is extended or adjusted under 35 U.S.C. 154(b) by 641 days.

(21) Appl. No.: 12/903,236

(22) Filed: Oct. 13, 2010

(65) Prior Publication Data

US 2011/0091094 A1   Apr. 21, 2011

Related U.S. Application Data

(60) Provisional application No. 61/252,746, filed on Oct. 19, 2009.

(51) Int. Cl.
*G06K 9/00* (2006.01)
(52) U.S. Cl.
USPC .............................. 382/141; 73/23.2; 210/652
(58) Field of Classification Search
USPC ................. 382/100, 141, 152, 209, 224–228; 210/640, 650–655; 73/23.2, 38, 40, 52
See application file for complete search history.

(56) References Cited

U.S. PATENT DOCUMENTS

| | | | | |
|---|---|---|---|---|
| 4,189,938 A * | 2/1980 | Heim | | 73/40.7 |
| 5,538,642 A * | 7/1996 | Solie | | 210/652 |
| 5,640,236 A | 6/1997 | Nagashima | | |
| 5,674,404 A * | 10/1997 | Kenley et al. | | 210/741 |
| 5,763,765 A | 6/1998 | Lamont et al. | | |
| 6,228,271 B1 * | 5/2001 | Cote | | 210/739 |
| 6,293,998 B1 * | 9/2001 | Dolan et al. | | 95/96 |
| 6,324,898 B1 * | 12/2001 | Cote et al. | | 73/38 |
| 6,370,943 B1 * | 4/2002 | Glucina et al. | | 73/38 |
| 6,451,201 B1 * | 9/2002 | Cadera et al. | | 210/85 |
| 6,632,356 B2 * | 10/2003 | Hallan et al. | | 210/321.6 |
| 6,640,615 B1 * | 11/2003 | Morrow | | 73/38 |
| 6,680,778 B2 | 1/2004 | Hinnrichs et al. | | |
| 6,766,259 B2 | 7/2004 | Padgett et al. | | |
| 6,821,428 B1 * | 11/2004 | Zeiher et al. | | 210/634 |
| 6,838,002 B2 * | 1/2005 | Zeiher et al. | | 210/650 |
| 7,012,678 B2 * | 3/2006 | Enomoto et al. | | 356/237.1 |
| 7,216,529 B2 * | 5/2007 | Ventresque et al. | | 73/40 |

(Continued)

FOREIGN PATENT DOCUMENTS

| | | |
|---|---|---|
| EP | 1296125 | 3/2003 |
| EP | 1300186 | 2/2007 |

(Continued)

OTHER PUBLICATIONS

"Membrane Element Autopsy Manual," Water Treatment Technology Program Report #17, U.S. Bureau of Reclamation, 1996.

(Continued)

*Primary Examiner* — Aaron W Carter
(74) *Attorney, Agent, or Firm* — Edward W. Black

(57) ABSTRACT

Methods for testing the integrity of spiral wound modules including the introduction of pressurized gas within a sealed permeate collection tube and the detection of gas exiting at least one of the scroll faces of the module. The location(s) of gas exiting the scroll face can be correlated to defects in the module. In preferred embodiments, the subject test methods are non-destructive and can be applied to modules in either a dry or wet condition.

10 Claims, 4 Drawing Sheets

(56) References Cited

U.S. PATENT DOCUMENTS

| | | | |
|---|---|---|---|
| 7,314,565 B2* | 1/2008 | Sabottke et al. | 210/640 |
| 7,318,898 B2* | 1/2008 | Sabottke | 210/650 |
| 7,357,859 B2* | 4/2008 | Rajagopalan et al. | 210/87 |
| 7,698,928 B2* | 4/2010 | Jons et al. | 73/38 |
| 7,875,177 B2* | 1/2011 | Haynes et al. | 210/321.85 |
| 7,972,515 B1* | 7/2011 | Mangum et al. | 210/650 |
| 8,272,251 B2* | 9/2012 | Jons et al. | 73/38 |
| 8,348,499 B2* | 1/2013 | Jons et al. | 374/4 |
| 2002/0176617 A1 | 11/2002 | Simonetti | |
| 2004/0019438 A1 | 1/2004 | Padgett et al. | |
| 2005/0050943 A1 | 3/2005 | Barber et al. | |
| 2007/0089489 A1 | 4/2007 | Lewnard et al. | |
| 2007/0131556 A1* | 6/2007 | Lambie | 204/666 |
| 2008/0105038 A1* | 5/2008 | Jons et al. | 73/38 |
| 2008/0202242 A1 | 8/2008 | Mickols et al. | |
| 2009/0120873 A1* | 5/2009 | Becker et al. | 210/636 |
| 2010/0148752 A1* | 6/2010 | Jons et al. | 324/92 |
| 2013/0126431 A1* | 5/2013 | Henson et al. | 210/638 |
| 2013/0161258 A1* | 6/2013 | Marschke et al. | 210/650 |

FOREIGN PATENT DOCUMENTS

| | | |
|---|---|---|
| EP | 1775015 | 4/2007 |
| FR | 2671184 | 3/1992 |
| JP | 56124403 | 9/1981 |
| JP | 8252440 | 11/1996 |
| JP | 2007-007539 | 1/2007 |
| JP | 2010082587 | 4/2010 |
| WO | 02095370 | 11/2002 |

OTHER PUBLICATIONS

J. Lozier, et. al., "Microbial Removal and Integrity Monitoring of High-Pressure Membranes", AWWA Research Foundation, 2003.

M.M. Nederlof, et. al., "Integrity of membrane elements, vessels and systems," Desalting and Water Purification Research Report 55, Bureau of Reclamation, 1997.

S. Adham, et. al., Monitoring the integrity of reverse osmosis membranes' Desalination 119, (1998), 142-150.

ASTM D6908-03, "Standard Practice for Integrity Testing of Water Filtration Membrane Sytems", ASTM International, West Conshohocken, PA (Jun. 2003), 1-13).

Laine, J.M. et al., "Acoustic sensor:a novel technique for low pressure membrane integrity monitoring," Desalination 119 (1998), 73-77.

"FILMTEC Membranes: Probing Reverse Osmosis Systems," DOW Form No. 609-00235-0404, Dow Chemical, Midland, MI, (Nov. 1997).

D. Van Gauwbergen, et al., Macroscopic Fluid Flow Conditions in Spiral-Wound Membrane Elements, Desalination 110, (1997), 287-299.

Roth, et al., Sodium Chloride Stimulus-Response Experiments in Spiral Wound Reverse Osmosis Membranes: A New Method to Detect Fouling, Desalination 121, (1999), 183-193.

"Methods for Monitoring the Integrity of Reverse Osmosis Ans Nanofiltration Membrane Systems", Desalting and Water Purification Research Report No. 55, U.S. Bureau of Reclamation, 2000.

Steven D. Jons, et al., "Sensitive Integrity Test for RO.NF Elements", presented at The Conference on Industrial Water, Official Proceedings The International Water Conference, 66th Annual Meeting, Oct. 2005.

U.S. App. No. 12/095,527, Larson et al., Insertion-Point Seal for Spiral Wound Module., Commonly owned, shares at least one common inventor (corresponds to WO 2007/067751), Dec. 6, 2006.

U.S. Appl. No. 12/436,819, Jons, Steven D., Method of Testing Membranes and Membrane-Based Systems., Commonly owned, shares at least one common inventor, May 7, 2009.

U.S. Appl. No. 12/903,254, Jons et al., Method of Testing Spiral Wound Modules by Thermal Imaging., Commonly owned, shares at least one common inventor, Oct. 13, 2010.

* cited by examiner

US 8,571,296 B2

METHOD OF TESTING THE INTEGRITY OF SPIRAL WOUND MODULES

CROSS REFERENCE STATEMENT

This application claims the benefit of U.S. Provisional Application No. 61/252,746, filed Oct. 19, 2009, the entire content of which is incorporated herein by reference.

TECHNICAL FIELD

The present invention is directed toward means and methods for testing the integrity of spiral wound modules. The invention includes methods comprising the introduction of pressurized test gas within a sealed permeate collection tube of the module and the detection of a test gas exiting from at least one scroll face of the module.

DESCRIPTION OF THE RELATED ART

A variety of membrane-based modules are known in the art including spiral wound, tubular, hollow fiber and plate-and-frame type configurations. Each type of module may have leaks due to defects in various component parts or as a result of defects in manufacturing process utilized to construct the module. For example, leaks in spiral wound modules typically occur due to defects in the membrane sheets (e.g. pinholes, scratches or other defects), or misaligned membrane sheets and failed glue lines which may occur during module assemble. Due to their wound configuration, such defects are particularly difficult to detect and locate in spiral wound modules.

US 2008/0105038 describes a method for testing spiral wound modules involving the introduction of test particles into a liquid feed stream from the module. The particles are of a size larger than the nominal cut-off of the membrane such that the detection of particles within the permeate can be correlated to a leak. While effective, such techniques require that the module be tested during operation, i.e. "on-line" with feed liquid flowing thru the module.

JP 2007/007539 describes another type of on-line test method involving the introduction of pressurized gas into the feed liquid and subsequent detection of bubbles in the permeate liquid.

ASTM D 6908-03 (Integrity Testing of Water Filtration Membrane Systems) describes a variety of methods for testing the integrity of membrane systems including pressure and vacuum decay tests.

STATEMENT OF THE INVENTION

The present invention is directed toward means and methods for testing the integrity of spiral wound modules. In one embodiment the test method comprises the steps of: sealing the opposing ends of a permeate collection tube of the module, introducing a pressurized test gas into the permeate collection tube, and detecting test gas exiting from at least one scroll face of the spiral wound module. Many additional embodiments are disclosed.

DETAILED DESCRIPTION OF THE INVENTION

Figure 1:
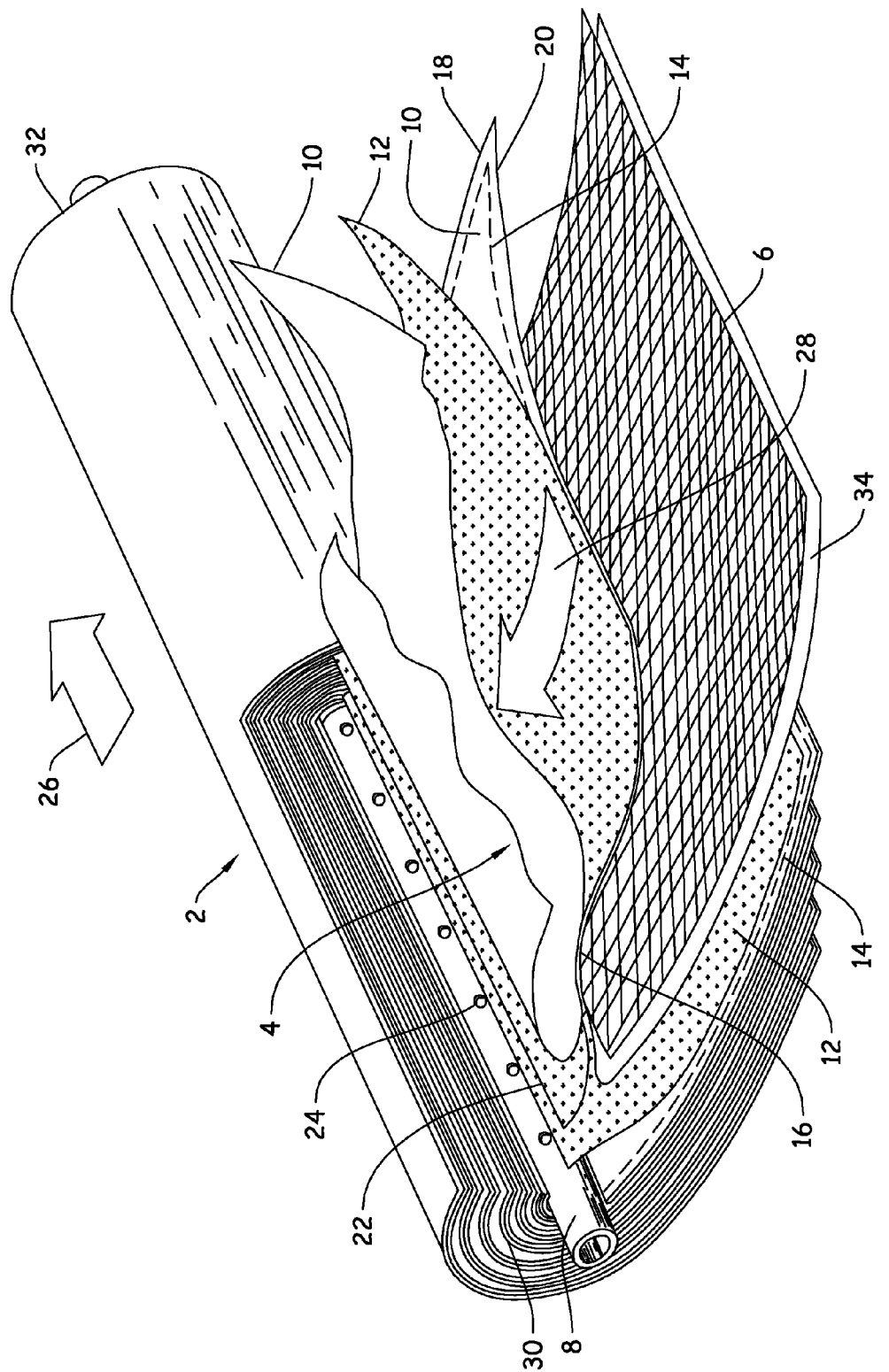
FIG. 1 is a perspective, partially cut-away view of a spiral wound module.

Spiral wound modules (also referred to as "elements") are well known for use in a variety of fluid separations including both gas and liquid phase separations. Due to their spiral configuration, a relatively large membrane surface area can be packed into an individual module. Depending upon the specific membrane used, spiral wound modules can be used in a wide variety of applications including: reverse osmosis (RO), nanofiltration (NF), ultrafiltration (UF) and microfiltration (MF); however, for purposes of the present invention RO and NF are preferred. Examples of common liquid separations include the treatment of liquid feeds such as the concentration and/or salt removal in food, dairy and sweetener feeds; desalination of water, removal of divalent ionic species such as calcium and barium ions, and removal of larger constituents such as cysts, viruses, and pesticides. A typical module includes a permeate collection tube, at least one but preferably many membrane envelopes, and an outer housing. While modules are available in a variety of sizes, one of the more common industrial RO modules is available with a standard 8 inch (20.3 cm) diameter and 40 inch (101.6 cm) length. For a typical 8 inch diameter module, 20 to 31 individual membrane envelopes are wound around the permeate collection tube (i.e. for permeate collection tubes having an outer diameter of from about 1 to 3 inches (2.5 to 7.6 cm)). The outer housing of a module may include integral fluid seals to provide a seal within the pressure vessel as described in U.S. Pat. Nos. 6,299,772 and 6,066,254 to Huschke et al. Specific examples of commercially available spiral wound modules include: BW30-440i brackish water modules, SW30-XLE-400i sea water desalination modules, and NF-400 nanofiltration modules available from the FilmTec Corporation. In operation, four to eight modules are typically serially connected within a common pressure vessel. The individual modules within a vessel are typically of the same type, but different types of modules may be used, as described in US 2007/0272628 to Mickols et al.

A spiral wound module suitable for use in the present invention is generally shown at 2 in FIG. 1. The module (2) is formed by winding one or more membrane envelopes (4) and optional feed channel spacer sheet(s) ("feed spacers") (6) about a permeate collection tube (8). Each membrane envelope (4) preferably comprises two substantially rectangular membrane sheets (10) surrounding a permeate channel spacer sheet ("permeate spacer") (12). This sandwich-type structure is secured together, e.g. by sealant (14), along three edges (16, 18, 20) to form an envelope while the fourth edge (22) abuts the permeate collection tube (8) so that the inside portion of the envelope (and optional permeate spacer (12)) is in fluid communication with a plurality of openings (24) extending along the length of the permeate collection tube (8). In a preferred embodiment, the module (2) comprises a plurality of membrane envelops (4) separated by a plurality of feed spacers sheets (6). Membrane envelops (4) are commonly formed by joining the back side surfaces of adjacently positioned membrane leaf packets, wherein each leaf packet comprises a substantially rectangular membrane sheet (10) folded upon itself to define two membrane "leaves" wherein the front sides (34) of each leaf are facing each other and the fold is axially aligned with the fourth edge (22) of the membrane envelope (4), i.e. parallel with the permeate collection tube (8). A feed spacer sheet (6) is shown located between facing front sides (34) of the folded membrane sheet (10). The feed spacer sheet (6) facilitates flow of feed fluid in an axial direction (i.e. parallel with the permeate collection tube (8)) through the module (2). In this embodiment, the membrane envelope (4) is formed by joining the back sides of two adjacently positioned membrane leaves. While not shown, additional intermediate layers may also be included in the assembly.

During module fabrication, permeate spacer sheets (12) may be attached about the circumference of the permeate collection tube (8) with membrane leaf packets interleaved therebetween. The back sides of adjacently positioned membrane leaves are sealed about portions of their periphery (16, 18, 20) to enclose the permeate spacer sheet (12) to form a membrane envelope (4). The membrane envelope(s) (4) and feed spacer(s) (6) are wound or "rolled" about the permeate collection tube (8) to form two opposing scroll faces (30, 32) at opposing ends and the resulting spiral bundle is held in place, such as by circumferentially-wound tape or other means until an outer housing can be secured about the partially constructed module (2). The sealant (14) used for sealing the edges (16, 18, 20) of the membrane envelope (4) preferably permits relative movement of the various sheet materials during the winding process. That is, the cure rate or period of time before which the sealant (14) becomes tacky is preferably longer than that required to assemble and wind the membrane envelopes (4) about the permeate collection tube (8).

Arrows shown in FIG. 1 represent the approximate flow directions (26, 28) of feed and permeate during operation. Feed fluid enters the module (2) from an inlet scroll face (30) and flows across the front side(s) 34 of the membrane sheet(s) (10) and exits the module (2) at the opposing outlet scroll face (32). Permeate fluid flows along the permeate spacer sheet (12) in a direction approximately perpendicular to the feed flow as indicated by arrow (28). Actual fluid flow paths vary with details of construction and operating conditions.

Materials for constructing various components of spiral wound modules are well known in the art. Suitable sealants for sealing membrane envelopes include urethanes, epoxies, silicones, acrylates, hot melt adhesives and UV curable adhesives. While less common, other sealing means may also be used such as application of heat, ultrasonic welding and tape. Permeate collection tubes are typically made from plastic materials such as acrylonitrile-butadiene-styrene, polyvinyl chloride, polysulfone, poly (phenylene oxide), polystyrene, polypropylene, polyethylene or the like. Tricot polyester materials are commonly used as permeate spacers. Representative feed spacers are described in more detail in U.S. Pat. No. 6,881,336 to Johnson. Representative example feed spacers include polyethylene, polyester, and polypropylene mesh materials such as those commercially available under the trade name VEXAR™ from Conwed Plastics. During module fabrication, long glass fibers may be wound about the partially constructed module and resin (e.g. liquid epoxy) is applied and hardened. The ends of modules are often fitted with an anti-telescoping device or end cap (not shown) designed to prevent membrane envelopes from shifting under the pressure differential between the inlet and outlet scroll ends of the module. The end cap is commonly fitted with an elastomeric seal (not shown) to form a tight fluid connection between the module and a pressure vessel (not shown). Examples of end cap designs are described in U.S. Pat. No. 6,632,356 to Hallan, et al., including FilmTec Corporation's iLEC™ interlocking end caps. Additional details regarding various components and construction of spiral wound modules are provided in the literature see for example: U.S. Pat. No. 5,538,642 to Solie which describes a technique for attaching the permeate spacer to the permeate collection tube, WO 2007/067751 to Jons et. al which describes trimming operations and the use of a UV adhesive for forming an insertion point seal, and U.S. Pat. No. 5,096,584 to Reddy et al. which describes various embodiments, components and construction techniques particularly suited for gas separations.

For purposes of the present invention, the type of membrane sheet is not particularly limited. The selection of membrane sheet is based on the specific application, feed source, solute, and foulants. While RO and NF flat sheet membranes have been formed from many different materials (e.g. cellulose acetate materials, polysulfone, polyether sulfone), the most commercially successful membranes have been thin film composite membranes. One preferred composite membrane sheet is FilmTec Corporation's FT-30™ membrane. Commercial thin film composite membranes typically comprises a bottom layer (back side) of a nonwoven polyester material web (e.g. PET scrim), a middle layer of a microporous polymer such as polysulfone having a thickness of about 25-125 microns, and top layer (front side) comprising a thin film polyamide layer having a thickness less than about 1 micron and more commonly from about 0.010 to 0.1 micron. The polyamide layer is preferably created by an interfacial polycondensation reaction between a polyfunctional amine monomer and a polyfunctional acyl halide monomer upon the surface of the microporous polysulfone as described in U.S. Pat. Nos. 4,277,344 and 5,658,460 to Cadotte et al; and U.S. Pat. No. 6,878,278 to Mickols. Methods of modifying such polyamide membranes are described in U.S. Pat. No. 5,876,602 to Jons et. al.; U.S. Pat. No. 5,755,964, U.S. Pat. No. 6,280,853 and US 2009/0159527 to Mickols; U.S. Pat. No. 4,888,116; U.S. Pat. No. 4,765,897; U.S. Pat. No. 4,964,998 to Cadotte et. al. and US 2007/0251883 and US 2008/0185332 to Niu et al. As previously indicated, RO and NF type membrane sheets and corresponding spiral wound modules are preferred with respect to the present invention.

The invention includes a method for testing the integrity of a spiral wound module. As will be described, the method may be qualitative, quantitative or both. The method is preferably conducted in a gaseous environment, i.e., not submerged within a liquid such as a water bath, nor operating "on-line" with liquid flowing through the module. That is, the module is preferably tested while "off-line" without pressurized feed liquid flowing through the module. In a preferred embodiment, the gaseous environment comprises ambient air, e.g. air at atmospheric pressures and temperatures (e.g. 10 to 35° C.). However, other gas environments may be used, e.g. nitrogen gas provided in a closed or hooded chamber or air at pressure above or below atmosphere. The subject method comprises the steps of: sealing the opposing ends of the permeate collection tube, introducing a pressurized test gas into the permeate collection tube, and detecting test gas exiting from at least one scroll face of the spiral wound module. The step of sealing the opposing ends of the permeate collection tube from the gaseous environment is not particularly limited and may be accomplished by way of a variety of means including insertion of seals, stoppers or plugs into the opposing ends of the permeate collection tube or by placing a fluid tight cover or barrier over the opposing ends of the permeate collection tube. The step of introducing a pressurized test gas into the permeate collection tube is likewise not particularly limited and is preferably performed at pressures that are increased relative to the gaseous environment less than about 200 kPa, and more preferably less than about 100 kPa. For example, pressurized test gas may be introduced into the permeate collection tube by way of a pipe or hose which is in sealing engagement with an end of the permeate collection tube and in fluid communication with a source of pressurized gas, e.g. a pressurized gas holding tank.

The step of detection is not particularly limited but preferably involves identifying the presence of specific test gas molecules exiting the scroll face of the module as they enter into the surrounding gaseous environment rather than identifying the formation of a physical structure such as a bubble. That is, the step of detection is preferably conducted in the absence of a gas liquid interface, such as a bubble. The detector, including any incident light source and filters, is capable of differentiating test gas molecules from the mix of molecules in the gaseous environment surrounding the scroll face. The step of detection is preferably accomplished by selecting a test gas and detector such that the detector is more sensitive (i.e. responsive) to the test gas molecules as compared with the mix of other molecules in the gaseous environment at the scroll face. The detector is preferably capable of detecting test gas molecules at less than a 10% molar fraction, more preferably at less than 1% molar fraction, in a gaseous environment corresponding to that at the scroll face.

The sensitivity of pressure and vacuum decay tests (such as those described in ASTM D 6908-03) is typically limited by variability in the rate at which air passes through "good" membrane within a defect-free module. That is, background air passage varies significantly from module to module. Preferred embodiments of the present invention are an improvement over such prior techniques as they have the ability to spatially resolve separate regions of the scroll face, thereby allowing leaks to be compared at a high sensitivity with typical background gas passage within the same module. Such an improvement can be achieve while testing modules in either a dry state (e.g. after module assembly but prior to the introduction of a liquid feed stream into the module or soaking the module within liquid, or if exposed to such liquid, after forced air drying of the module) or wet state (i.e. modules that have previously been soaked or operated "on-line" and have liquid-filled pores). When testing modules provided in a wet state, the modules are preferably drained prior to testing as standing water can potentially mask a defect. Moreover, the step of detection is preferably conducted in the absence of standing liquid within the element or at the scroll face, e.g. a gas-liquid interface upon the scroll face is preferably avoided.

The step of detection may focus upon the entire scroll face or selected locations. By way of example, the test gas may be visually apparent to the naked eye as it exits the scroll face of the module. In other embodiments, the test gas may be detected by a detector which is sensitive to certain wavelengths of light at which molecules of the test gas absorb, fluoresce, or phosphoresce. For example, the test gas may be visually apparent from an image recorded by a camera sensitive to wavelengths of light that are absorbed or emitted by the test gas. The sensitivity of such a test method may be further enhanced by restricting (e.g. using a band pass or cut-off filter) light that reaches the camera or by illuminating the scroll face of the spiral wound module with light that is absorbed by the test gas during detection (as subsequently described in connection with FIG. 3). For example, pressurized carbon dioxide may be introduced into a sealed permeate collection tube of a spiral wound module. Detection of carbon dioxide exiting the scroll face may be accomplished by obtaining an image of the scroll face with an infrared digital camera sensitive to wavelengths of about 4.1 to 4.5 microns. Use of carbon dioxide as a test gas avoids potential interference associated with the presence of water which is relatively non-absorbing of wavelengths in range of from 3.5 to 4.6 microns. In another embodiment, a light is scanned (rastered) across the surface of a scroll and the resulting intensity of reflected light is recorded as a function of position. In still other embodiments, the test gas exiting the scroll face may be detected by non-optical means such as by a combustible gas detector, e.g. catalytic bead sensors, electrochemical sensors and paper tape detectors. For example, one or more catalytic bead sensors may be positioned at specific points near the scroll face to detect the presence of test gas molecules. Test gas may alternatively be sampled from specific points near the scroll face, such as by a tube positioned near the surface that directs the test gas to a suitable detector. While detection may be accomplished by sequentially detecting the test gas from a plurality of points near the scroll face, it is preferable that the test gas is simultaneously detected at a plurality of points near the scroll face. However in either case, an image or flow pattern of the scroll face can be constructed from the detection data which may then be used in assessing the integrity of the module.

In a preferred embodiment, the step of detecting test gas exiting from one or both scroll faces of the spiral wound module includes the step of obtaining an image of the test gas as it exits the scroll face(s). Preferred embodiments involve recording or capturing an image of the test gas exiting the scroll face by way of a camera. For purposes of the present invention, the term "camera" is intended to broadly include any image capturing device such as video camera, still camera, digital camera, charge-coupled device (CCD) type camera, visible light camera, infrared camera, infrared detector or sensing array. Examples include: infrared cameras such as the ThermaCam™ and Prism DS line of thermal imaging cameras available from FLIR Systems Inc, TVS-100 Series Thermal Video Systems available from Cincinnati Electronics Corp. and Thermovision 550™ available from Agema Infrared Systems. The image may include a still, a series of stills or a continuous recording over a period of time. Moreover, the image may be a spatially resolved spectrograph. The image may be recorded or stored upon an appropriate medium including but not limited to optical, magnetic or electronic media such as photographic film, floppy disks, compact disk, digital video disk, disk drives, RAM microchips, (flash) memory cards, or other computer readable medium. The storage medium may be locally connected to the camera or may be remotely connected to a communication network such as the internet, a local area network or wide area network to which the camera is also attached or in communication. For example, an image may be electronically captured by a camera and transmitted to a central server using either wireless or wire-based communications channels. The image may also be displayed such as by output to a separate monitor or an integrated screen, e.g. as part of a digital camera. Similarly, the image may be displayed such as by way of output to a printer or X-Y plot. Once captured, the image or series of images may be compared with a reference standard, e.g. a comparable image taken under similar test conditions of a defect-free spiral wound module, or it may be assessed for lack of rotational asymmetry or localized inhomogeneities. The comparison or assessment may be qualitative or quantitative.

Figure 2A:
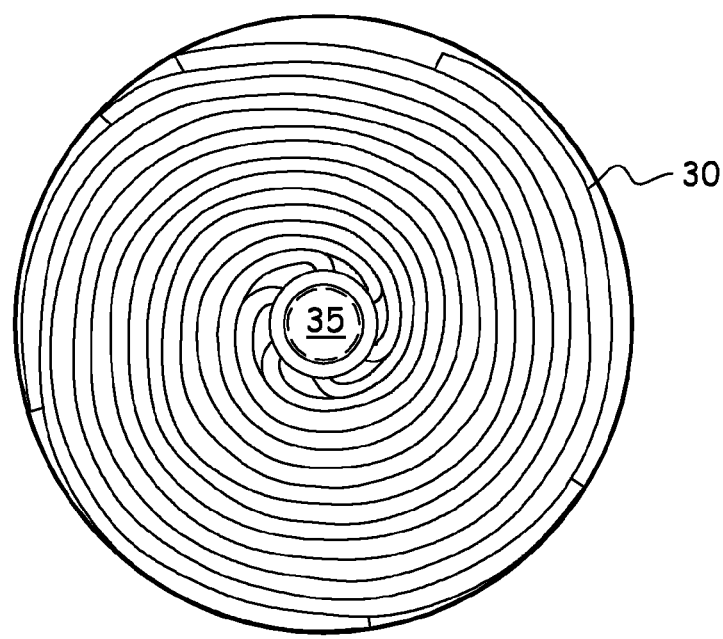
FIG. 2A is an idealized elevational (end) view of a defect-free spiral wound module showing the scroll face of the module during testing.
Figure 2B:
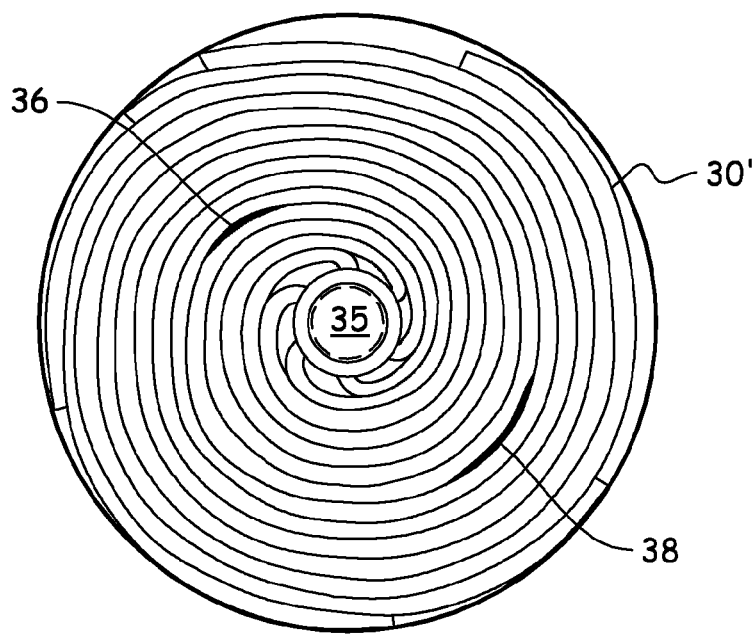
FIG. 2B is an idealized elevational (end) view of a defective spiral wound module showing the scroll face of the module during testing.

As illustrated in FIGS. 2A and 2B, the detection of test gas exiting the scroll face of the spiral wound module allows for the identification of defects in the module, as manifested by inhomogeneous or asymmetric flow (i.e. leaks) of test gas from the scroll face. FIG. 2A illustrates an idealized image of symmetric flow of test gas from the scroll face (30) of a defect-free spiral wound module equipped with a plug (35) sealing the permeate collection tube (not shown) while being subjected to the present test method. While not necessarily uniform across the entire scroll face (30), the distribution of exiting test gas is nevertheless generally symmetric as indicated by the absence of disproportionate or isolated gas flow regions. In this embodiment, the test gas naturally permeates through the membrane into the feed channel spacer and exits in a relatively symmetric manner across the scroll face. In contrast, FIG. 2B illustrates an idealized image of an asymmetric or inhomogeneous flow of test gas from the scroll face (30') of a spiral wound module including two defects which allow test gas to escape (i.e. leak) from an otherwise spiral pathway within a membrane envelop and disproportionately exit the scroll face in areas (36, 38) adjacent to or in line with defects. For example, a defect in the membrane or glue line may significantly increase the amount of test gas entering the feed channel spacer as compared to normal permeation. In addition to identifying the location of defects, the volume of test gas exiting the scroll face at a given location may also provide information regarding the nature and magnitude of the defect. For example, the intensity of light at specific wavelengths absorbed by the test molecules reflected from a given location of the scroll face, as shown in an image captured by a digital camera with an appropriate bandwidth filter, can be related to the concentration of test gas exiting the scroll face and can be correlated to the magnitude of a leak. Such evaluations may be facilitated by known signal process techniques, including comparisons with reference images maintained in a database. Such comparisons may be based upon a still image (a point in time), or a series of images integrated over a period of time. Electronic signal analyzers and general purposes digital computers may be used to facilitate the analysis of such images. The use of such equipment and applicable techniques are described in: U.S. Pat. No. 5,640,236; U.S. Pat. No. 5,763,765; U.S. Pat. No. 6,766,259; 6,680,778; US 2002/0176617, the entire contents of which are incorporated herein by reference. Thus, asymmetric or inhomogeneous flow patterns of test gas exiting from the scroll face, as captured by a camera, represent leaks in the module which can be correlated to the location, magnitude and nature of a defect. Various test gases, bandwidth filters and illuminating lights may be selected to suit the requirements of a given application.

Figure 3:
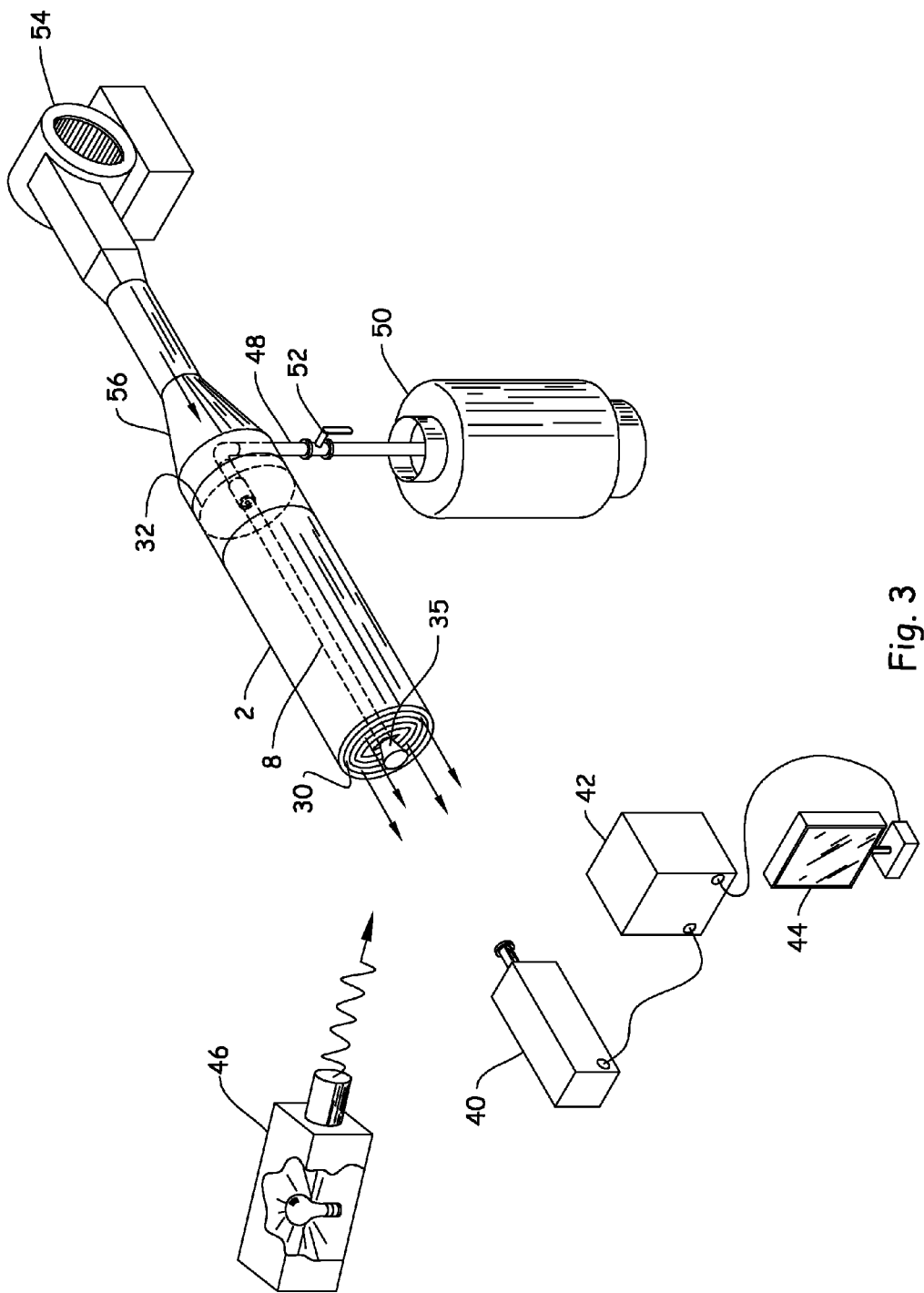
FIG. 3 is a schematic view of an idealized set-up for practicing one embodiment of the invention.

FIG. 3 schematically illustrates an idealized set-up for practicing one embodiment of the invention. As shown, a camera (40) is positioned facing toward a scroll face (30) of a spiral wound module (2). The camera (40) may be optionally connected to an image storage device and signal processor such as a general purpose computer (42) which may be optionally connected to a monitor (44) or printer (not shown) for displaying images captured by the camera (40). As previously describe, the scroll face (30) of the module (2) may optionally be illuminated by a light source (46) emitting light having a wavelength absorbed by test gas exiting the scroll face (30). A plug (35) seals one end of the permeate collection tube (8) with the opposite end in sealing engagement with pipe (48). Pressurized test gas is introduced into the permeate collection tube (8) by way of a pipe (48) connected to a source of pressurized gas such as a holding tank (50) including a valve (52). Once pressurized test gas is introduced into the permeate collection tube (8), the test gas flows through membrane envelop(s) in fluid communication with the permeate tube (not shown). A portion of the test gas may pass through the membrane (particularly defects in the membrane such as pin holes, etc.) and ultimately exits the module (2) at the scroll face (30). An image of the test gas exiting the scroll face (30) is recorded by the camera (40) and may be optional stored, analyzed and displayed via computer (42) and monitor (44). In a preferred embodiment, the image is compared with that of a reference standard (e.g. image taken from a defect-free module tested under similar test conditions, i.e. same test gas, pressures, time delay between imaging, etc.), such as by way of known image processing techniques previously noted in the prior art.

FIG. 3 also illustrates an optional embodiment of the invention wherein a sweep gas is introduced into the module (2) from the scroll face (32) opposite to that where test gas detection occurs. While a variety of techniques may be utilized, the illustrated embodiment includes the use of a fan or blower (54) connected to the scroll face (32) by way of a conduit (56). The blower (54) forces a sweep gas such as air into the scroll face (32). The sweep gas travels between wound membrane envelops (i.e. along the feed spacer sheet) along the length of the module and exits the scroll face (30). The use of a sweep gas can facilitate the detection of test gas exiting the scroll face. For example, the individual flow pathways (as indicated by arrow) of gas exiting the scroll face (30) between the overlapping layers of membrane envelope can be maintained for a greater distance and time period before substantial mixing due to the increased gas flow provided by the sweep gas, thereby facilitating detection of test gas associated with a specific location on the scroll face. As an example, in the absence of a sweep gas, test gas passing through a leak near the center of a membrane envelope sheet could spread throughout the region between adjacent membrane envelopes to create a spiral pattern on the scroll face. This spiral pattern can provide useful information about the leak. However, in the presence of a sweep gas, test gas from the leak region may be confined to a smaller region and improve sensitivity of the test method.

Figure 4:
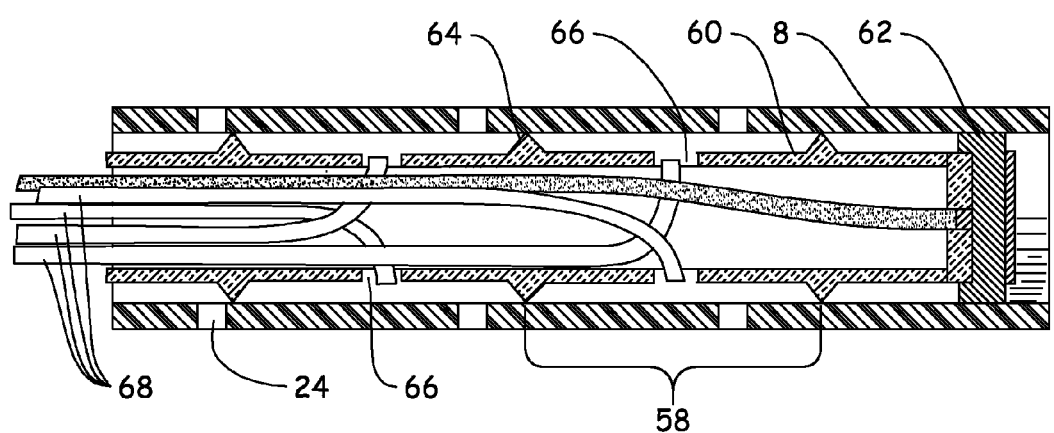
FIG. 4 is an idealized, cross-sectional, partially cut-away view of a permeate collection tube including a plurality of openings along its length and a gas dispensing probe for introducing a plurality of pressurized gases to different sections within the tube.

FIG. 4 illustrates an alternative embodiment of the invention wherein the introduction of pressurized test gas into the permeate collection tube (8) comprises introducing the test gas to only a section (58) of the permeate collection tube (8) while simultaneously introducing a non-test gas (i.e. a gas different from the test gas and which is distinguishable from the test gas by the selected detection technique, e.g. a gas that absorbs a different wavelength of light or a gas that is not detected by a specific non-optical detector) to the remainder of the permeate collection tube. The manner in which the test gas and non-test gas are introduced are not particularly limited. FIG. 4 illustrates one embodiment wherein a gas nozzle (60) with end plug (62) is inserted into the permeate collection tube (8). The gas nozzle (60) includes projections (64) which engage the inner surface of the permeate collection tube and serve to at least partially segment section (58) from the remainder of the inside volume of the tube (8). The gas nozzle (60) includes a plurality of gas outlets (66) with corresponding gas hoses (68) for introducing pressurized gas into the permeate collection tube (8). The gas hoses (68) may be selectively connected to different sources of gas. For example, the gas hoses located in section (58) may be connected to a pressurized source of the test gas such as carbon dioxide; whereas all other gas hoses (68) may be connected to a pressurized source of non-test gas which for example may be the same composition as the gaseous environment in which the method is conducted. In an alternative embodiment, the pressurized source of gas connected to each gas hose may be varied during the test method such that images of test gas exiting the scroll face may be recorded based upon the introduction of test gas to different sections of the permeate collection tube. With such an embodiment, it may be useful to detect test gas exiting from both scroll faces of the module.

In another embodiment, a test gas is selected which is at least partially adsorbed upon the membrane envelop during testing. And as a consequence of adsorption, the passage of test gas through the module and out of from the scroll face(s) is delayed, except in areas where defects exist. This technique can increase sensitivity of the test method.

In yet another embodiment, the pressure within the module may be reduced, e.g. such as by way of drawing a vacuum from the permeate collect tube as previously described in the Related Art section, prior to introducing the pressurized test gas in accordance with the present method. This technique allows for a more even dissemination of the test gas within the permeate spacer sheets. Application of vacuum to the permeate collection tube prior to the test method also allows for preliminary screening based on vacuum decay rate.

As will be subsequently described, the selection of test gas is influenced by the specific means of detection; however, in most embodiments the test gas is one that is present in a gas state at standard temperature and pressure (STP) conditions. Non-limiting examples of applicable test gases include: carbon dioxide, sulfur hexafluoride, and propane. Additional examples include molecules having sufficient vapor pressure at STP to be entrained in a gas mixture (e.g. mixed with air, nitrogen, etc.) at detectable concentrations, such as water vapor or n-hexane. It is also within the scope of this invention to pass a non-test gas (e.g. non-detectable gas) through a heated reservoir to entrain test gases that otherwise might not be present at detectable concentrations (e.g. difluorobenzene).

While not particularly limited, the selection of test gas may be based upon a variety of criteria, including for example one or more of the following: 1) test gases that are easily detected by conventional cameras or non-optical detectors that differentiate test gas molecules from molecules in the surrounding gaseous environment. Examples of such non-optical detectors include mass spectrometers, halogen leak detectors (e.g. halide torch, positive ion emission from heated diode, corona discharge method), and combustible gas detectors (e.g. catalytic bead sensors, electrochemical sensors); 2) test gases that are easily distinguishable from background signals such as those associated with residual materials which may be present in the module or ambient gases such as air and water vapor; 3) test gases that are non-reactive with air; 4) test gases that are non-reactive with components of the module; 5) test gases that are non-toxic under testing conditions (e.g. carbon dioxide used at low concentration in an open air environment); and 6) test gases that are non-fouling of the membrane envelope.

Applicable test gases may be diluted in a carrier gas. Applicable test gases may also include molecules that may be entrained in air or other non-test gases at sufficient concentrations to be detected in the subject method. For example, sulfur hexafluoride, anhydrous ammonia, chlorine dioxide, acetic acid and Freon™ (chlorofluorocarbons and hydrochlorofluorocarbons) (preferably less having a molecular weight of less than about 150 Daltons) may be optically detected at low concentrations using cameras sensitive to wavelengths of from about 8 to 12 microns, whereas carbon dioxide, alkanes, alkenes and alcohols (preferably having a molecular weight of less than about 150 Daltons) may be optically detectable with cameras sensitive to wavelengths from about 3 to 5 microns. Further examples of applicable test gases include those which may be entrained in air or other non-test gas and which are aromatic. As previously indicated, gases that are temporarily adsorbed onto the membrane may be beneficial for some applications; however, any such interaction is preferably temporary—particularly after module use with a liquid feed stream.

The test method is non-destructive and may be integrated into a module manufacturing process before assembled modules are packaged. As previously indicated, the present method may be used to test spiral wound modules provided in either a wet or dry state. Moreover, the test method may be utilized under common manufacturing conditions, e.g. room temperature and pressure.

While the specific design of the spiral wound module may vary from that previously described, the spiral wound module preferably includes at least a permeate collection tube extending between two opposing ends and including a plurality of openings along its length, and at least one membrane envelope wound about the permeate collection tube and forming two opposing scroll faces, wherein the membrane envelope is in fluid communication (and preferably in sealing engagement) with the openings along the permeate collection tube. The membrane envelope is not particularly limited and may comprise a wide range of designs, compositions and structures. However, in several preferred embodiments, the membrane envelope comprises a structure which functions as an RO or NF membrane.

As the number of membrane envelopes within the module increases, preferred embodiments of the present invention become increasingly advantaged as compared with the previously described vacuum test method. In a preferred embodiment, the module comprises more than 50 membrane envelopes.

The entire content of each of the aforementioned patents and patent applications are incorporated herein by reference.

The invention claimed is:

1. A method for testing the integrity of a spiral wound module conducted in a gaseous environment, wherein the module comprises: a permeate collection tube extending between two opposing ends and including a plurality of openings along its length, and at least one membrane envelope wound about the permeate collection tube and forming two opposing scroll faces, wherein the membrane envelope is in fluid communication with the openings along the permeate collection tube; wherein the method comprises the steps of:
   sealing the opposing ends the permeate collection tube from the gaseous environment,
   introducing a pressurized test gas into the permeate collection tube, and
   detecting test gas exiting from at least one scroll face of the spiral wound module.

2. The method of claim 1 wherein the step of detecting comprises obtaining an image of test gas exiting the scroll face of the spiral wound module.

3. The method of claim 2 wherein the image of test gas exiting the scroll face of the spiral wound module is recorded by a camera.

4. The method of claim 3 wherein the image is compared with a reference standard.

5. The method of claim 3 wherein the test gas is detected by a camera sensitive to light of a wavelength within at least one of the following ranges: i) 3.5-4.6 microns and ii) 8-12 microns.

6. The method of claim 3 wherein the step of detecting comprises illuminating the scroll face with light having wavelengths which are at least partially absorbed by the test gas while recording an image of test gas exiting the scroll face of the spiral wound module with a camera sensitive to such wavelengths.

7. The method of claim 1 wherein the step of introducing a pressurized test gas into the permeate collection tube comprises introducing the test gas to a section of the permeate collection tube while simultaneously introducing a non-test gas to the remainder of the permeate collection tube.

8. The method of claim 1 wherein the membrane envelope comprises a reverse osmosis or nanofiltration membrane.

9. The method of claim 1 wherein the step of detecting comprises detecting test gas exiting one scroll face of the spiral wound module while simultaneously introducing a sweep gas to the opposite scroll face of the spiral wound module.

10. The method of claim 1 wherein the spiral wound module is provided in a dry state.

* * * * *